United States Patent
Lee et al.

(10) Patent No.: US 10,077,329 B1
(45) Date of Patent: Sep. 18, 2018

(54) METHOD OF PRODUCING POLYURETHANE DISPERSION BY SOLVENT FREE PROCESS

(71) Applicants: Da-Kong Lee, Taoyuan (TW); Chin-Jen Jwo, Taoyuan (TW); Yong-Shen Luo, Taoyuan (TW)

(72) Inventors: Da-Kong Lee, Taoyuan (TW); Chin-Jen Jwo, Taoyuan (TW); Yong-Shen Luo, Taoyuan (TW)

(73) Assignee: HO YU TEXTILE CO., LTD., Taoyuan (TW)

(*) Notice: Subject to any disclaimer, the term of this patent is extended or adjusted under 35 U.S.C. 154(b) by 0 days.

(21) Appl. No.: 15/460,323

(22) Filed: Mar. 16, 2017

(51) Int. Cl.
| | |
|---|---|
| C08G 18/08 | (2006.01) |
| C08G 18/10 | (2006.01) |
| C08G 18/66 | (2006.01) |
| C08G 18/72 | (2006.01) |
| C08G 18/76 | (2006.01) |
| C08G 18/75 | (2006.01) |
| C08L 75/12 | (2006.01) |

(52) U.S. Cl.
CPC ......... C08G 18/0866 (2013.01); C08G 18/10 (2013.01); C08G 18/6651 (2013.01); C08G 18/6685 (2013.01); C08G 18/722 (2013.01); C08G 18/758 (2013.01); C08G 18/765 (2013.01); C08L 75/12 (2013.01); *C08L 2201/54* (2013.01)

(58) Field of Classification Search
CPC ...... C08G 18/0866; C08G 18/10; C08L 75/12
See application file for complete search history.

(56) References Cited

U.S. PATENT DOCUMENTS

| | | | | |
|---|---|---|---|---|
| 2006/0183851 A1* | 8/2006 | Liu | ............. | A41C 3/0014 |
| | | | | 524/589 |
| 2011/0306724 A1* | 12/2011 | Campbell | .......... | C08G 18/0823 |
| | | | | 524/591 |

* cited by examiner

*Primary Examiner* — Hannah J Pak

(57) ABSTRACT

A method of producing PUD by a solvent free process includes drying polyol in vacuum; placing the dried polyol and DMBA in a reaction vessel to mix until a first mixture becomes transparent; adding diisocyanate which having functional group of isocyanate (—NCO) to the first mixture to react until —NCO terminated first prepolymer is formed; decreasing temperature of the —NCO terminated first prepolymer to 65° C.; adding a neutralizing agent to the —NCO terminated first prepolymer until —NCO terminated second prepolymer is formed; adding the remaining diisocyanate having isocyanate functional group to the —NCO terminated second prepolymer to form a second mixture; adding deionized water to the second mixture to form prepolymer dispersion; and adding chain extension agent to the prepolymer dispersion to rotate at a range of 200 to 2,000 rpm for chain extension for 1-3 hours until solid content 40.0 wt. % solvent free PUD is produced.

10 Claims, 1 Drawing Sheet

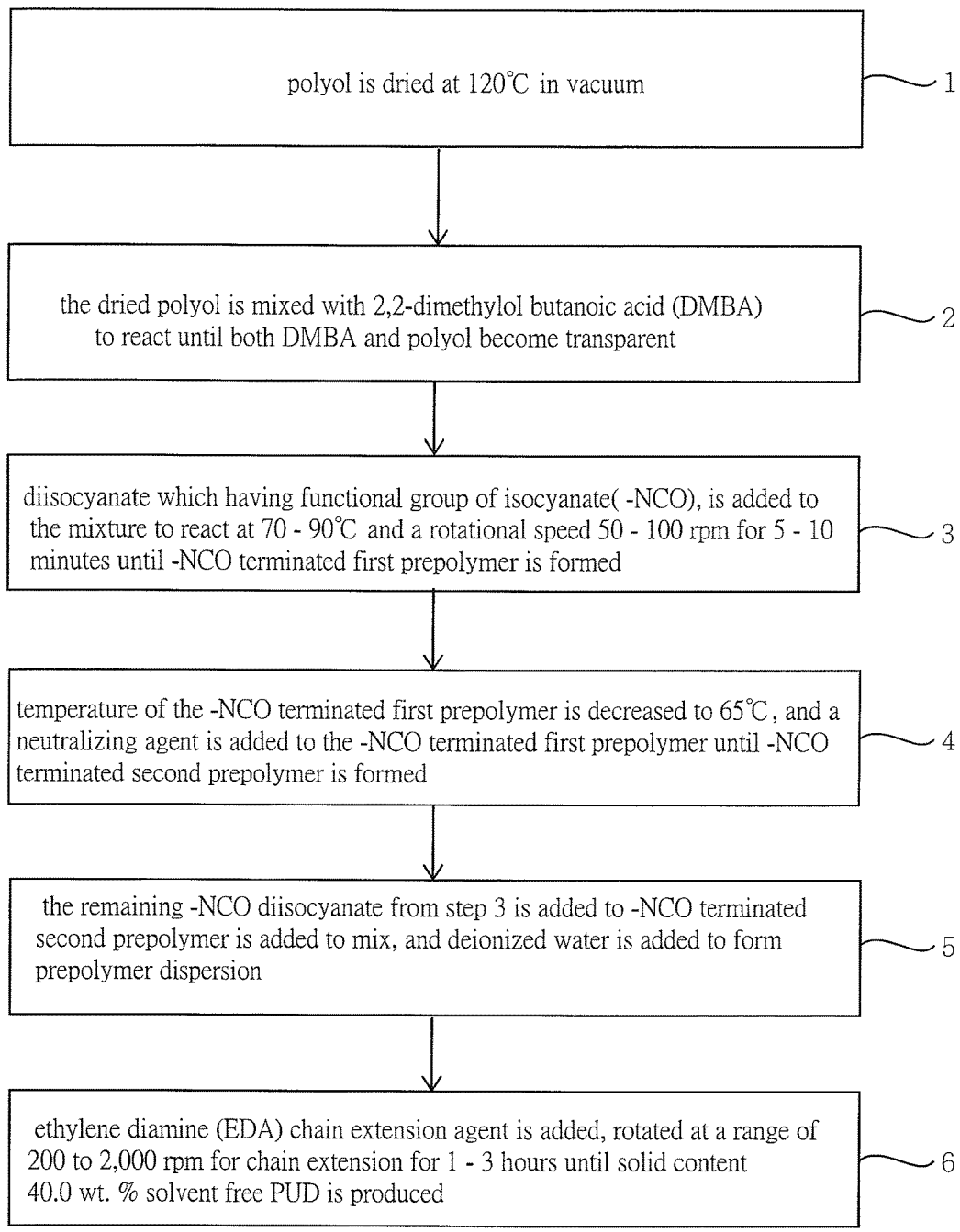

METHOD OF PRODUCING POLYURETHANE DISPERSION BY SOLVENT FREE PROCESS

BACKGROUND OF THE INVENTION

1. Field of the Invention

The invention relates to a method of producing polyurethane dispersion (PUD) and more particularly to a method of producing polyurethane dispersion by a solvent free process in which no organic solvent is added in the process. Raw materials being melted and the equivalent weight of —NCO terminated prepolymer being controlled properly to keep the viscosity low to avoid the use of solvent.

2. Description of Related Art

Extreme weather has caused a lot of disasters all over the world in recent years. It is due to the increase of the emission of the volatile organic compounds (VOCs) which leads to greenhouse effects and causes the global warming. In a typical acetone PUD process, large amount of solvent was used in the process due to the high melt point of 2,2-dimethylol propionic acid (DMPA) (170° C.-180° C.) and the high viscosity of —NCO terminated prepolymer.

Most commercial PUD products were produced by acetone process. The solvent was removed by distillation at the final stage. There are large amount of energy consumed, and there are still some solvent residuals left in the final products (about 200 ppm). The solvent residuals in the PUDs will cause the environmental hazard, increase the production cost and decrease the capacity.

In 2011 after the Detox movement held by Greenpeace organization, Adidas, C&A, H&M, Li-Ning, Nike and PUMA have formed the zero discharge of hazardous chemicals (ZDHC) organization. ZDHC declare that at 2020 the raw materials and the manufacture process of footwear and textile industry should reach ZDHC standards with zero discharge of hazardous chemicals. Most PUDs were produced by acetone process and there are large amount of solvent involved, and some solvent residuals left in the final products. The PUD products made by acetone process will not reach the ZDHC standards.

In 2008, Dr. Da-Kong Lee supervised the dissertation entitled of "Solvent free PUDs". Solvent free PUDs were derived from m-tetra-methylxylylene diisocyanate (m-TMXDI) with high temperature process. m-TMDXI is a tertiary isocyanate with benzyl group. It displays low reactivity and high thermal stability. For m-TMXDI based —NCO terminated prepolymer the viscosity can be controlled properly by increasing the reaction temperature up to 120° C.-130° C. to avoid the use of solvent. From the research, solvent free PUDs can be produced by using m-TMXDI as the diisocyanate with high reaction temperature at prepolymer preparation stage.

The solvent free PUDs prepared from the dissertation was carried out at 120° C.-130° C. It is difficult of controlling the process due to the highly exothermic reaction. If we cannot control the reaction temperature and viscosity properly, it will cause gelation. The process should be performed with intensive care.

Thus, the need for improvement still exists.

SUMMARY OF THE INVENTION

It is therefore one object of the invention to provide a method of producing polyurethane dispersion (PUD) by a solvent free process comprising the steps of 1 drying polyol at a predetermined temperature in vacuum for a predetermined period of time; 2 placing both the dried polyol and 2,2-dimethylol butanoic acid (DMBA) in a reaction vessel to mix at 90° C. and rotate at a rotational speed 100 rpm until a first mixture becomes transparent; 3 adding diisocyanate which having functional group of isocyanate (—NCO) to the first mixture to react at 70-90° C. and a rotational speed 50-100 rpm for 5-10 minutes until —NCO terminated first prepolymer is formed; 4 decreasing temperature of the —NCO terminated first prepolymer to 65° C.; 5 adding a neutralizing agent to the —NCO terminated first prepolymer for neutralization and catalysis until —NCO terminated second prepolymer is formed; 6 adding the remaining diisocyanate having isocyanate functional group from step 3 to the —NCO terminated second prepolymer to form a second mixture; 7 adding deionized water to the second mixture to form prepolymer dispersion; and 8 adding chain extension agent to the prepolymer dispersion to rotate at a range of 200 to 2,000 rpm for chain extension for 1-3 hours until solid content 40.0 wt. % solvent free PUD is produced; wherein a mole ratio of the polyol to the DMBA is 0.60 to 9.17, and a molar percentage of the polyol to DMBA is 36.9%:63.1% to 90.2%:9.8%; wherein a mole ratio of the diisocyanate having isocyanate functional group to the first mixture is 1.20 to 2.00, and a molar percentage of the diisocyanate having isocyanate functional group to the first mixture is 54.5%:45.5% to 66.7%:33.3%; wherein a mole ratio of the —NCO terminated first prepolymer to the neutralizing agent is 0.17 to 0.77, and a molar percentage of the —NCO terminated first prepolymer to the neutralizing agent is 14.5%:85.5% to 44.0%:56.0%; and wherein a mole ratio of the —NCO terminated second prepolymer to the remaining diisocyanate having isocyanate functional group is 0.07 to 98.44, and a molar percentage of the —NCO terminated second prepolymer to the remaining diisocyanate having isocyanate functional group is 6.7%:93.3% to 99.0%:1.0%.

Preferably, a hydrophilic percentage is defined as weight of hydrophilic molecules divided by weight of polyurethane (PU) molecules times 100%; a weight percentage (w/w) of hydrophilic molecules is 2.0 to 7.0%, the weight percentage (w/w) is 2.0%:98.0% to 6.5%:93.5%. The weight of hydrophilic molecules is weight of DMBA molecules; and the weight of PU molecules is defined as a summation of weights of molecules of diisocyanate, polyol, DMBA, the neutralizing agent, and the chain extension agent.

Preferably, equivalent of —NCO terminated second prepolymer is controlled at 4,500 g/eq. mol±5%, free —NCO %=0.93±5%; and a di-n-butylamine back titration method is used to measure the equivalent of —NCO terminated second prepolymer.

Preferably, in the step 1 the predetermined temperature is 120° C. and the predetermined period of time is two hours.

Preferably, in the step 2 both the dried polyol and DMBA are in the reaction vessel to mix for one hour.

Preferably, polyurethane (PU) is a polymer containing an urethane group on a molecular bond and includes a polymer having both an urethane group and an urea group.

Preferably, a molar mass of the polyol is 500 to 2,000 g/mol, and the polyol is implemented as a polycarbonate diols (PCD) having a functional group of carbonate, a polyether diols having a functional group of ether, a polyester diols having a functional group of ester, or a combination of any of polycarbonate diols (PCD) having a functional group of carbonate, a polyether diols having a functional group of ether, and a polyester diols having a functional group of ester.

Preferably, diisocyanates is implemented as m-TMXDI, isophorone diisocyanate (IPDI), 4,4'-Methylene dicyclohexyl diisocyanate (H$_{12}$MDI), hexamethylene diisocyanate (HDI), 1,4-cyclohexane diisocyanate (CHDI), xylene diisocyanate (XDI), hydrogenated xylylene diisocyanate (H$_6$XDI), 2,2,4/2,4, 4-trimethyl-1, 6-diisocyanatohexane, 50%/50%, 2,2,4/2,4,4-trimethyl-1, 6-diisocyanatohexane; 50%/50% (TMHDI), 5/2,6-bis (isocyanatomethyl) bicycle [2.2.1] heptane, isocyanatomethyl bicycle[2.2.1] heptane, (NBDI), methyl cyclohexamethylene diisocyanate (HTDI), L-lysine diisocyanate, (LDI), 1,8-octamethylene diisocyanate, 1,10-decamethylene diisocyanate, 1,12-dodecamethylene diisocyanate, 2-methylpentane-1,5-diyl diisocyanate (MPDI), or a combination of any of m-TMXDI, IPDI, H12MDI, HDI, CHDI, XDI, H6XDI, 2,2,4/2,4,4-trimethyl-1,6-diisocyanatohexane, 50%/50%, TMHDI, 5/2,6-bis (isocyanatomethyl) bicycle[2.2.1] heptane, NBDI, HTDI, LDI, 1,8-octamethylene diisocyanate, 1,10-decamethylene diisocyanate, 1,12-dodecamethylene diisocyanate, and MPDI.

Preferably, amines neutralizing agent is implemented as triethylamine, (TEA), tripropylamine (TPA), lithium hydroxide (LiOH), sodium hydroxide (NaOH), potassium hydroxide (KOH), or a combination of any of TEA, TPA, LiOH, NaOH, and KOH.

Preferably, a molar mass of the chain extension agent is less than 400 g/mol and the chain extension agent is implemented as diamines or diols; wherein diamines is implemented as ethylene diamine (EDA), butane diamine (BDA), pentane diamine (PDA), hexamethylene diamine (HDA) hydrazine (HH), carbonic dihydrazide (CDH), adipic dihydrazide (ADH); and wherein diols is implemented as ethylene glycol (EG), propylene glycol (PG), butylene glycol (BG), pentylene glycol, hexylene glycol (HG), or a combination of any of EG, PG, BG, pentylene glycol, and HG.

The invention has the following advantages and benefits in comparison with the conventional art:

Solvent free PUDs can be produced by the modified solvent free process without using any solvent to reduce the viscosity of the —NCO terminated prepolymer. The advantages of this invention are: reduce the capital investment, reduce the energy consumption, increase the capacity, zero volatile organic compounds. The PUDs produced by this novel modified solvent free process can reach the ZDHC (Zero discharge of hazardous chemicals) standards of ZDHC organization, and they are environmental friendly products.

The anionomer: 2,2-dimethylol butanoic acid (DMBA) adopted in this invention has the similar chemical structure with 2,2-dimethylol propionic acid (DMPA) with one extra methylene group. The melting point of DMBA has reduced sharply from 178° C.-180° C. for DMPA to 108° C.-115° C. for DMBA, and DMBA can be dissolved in polyol at the temperature as low as 70° C.-90° C., but DMPA can only be dissolved at 180° C. Therefore, —NCO terminated prepolymer can be produced without using any solvent.

The above and other objects, features and advantages of the invention will become apparent from the following detailed description taken with the accompanying drawings.

BRIEF DESCRIPTION OF THE DRAWINGS

FIG. 1 is a flow chart of a method of producing polyurethane dispersion by solvent free process according to the invention.

DETAILED DESCRIPTION OF THE INVENTION

Referring to FIG. 1, a method of producing polyurethane dispersion by a solvent free process in accordance with the invention is illustrated by comprising the following steps:

in step 1, polyol is dried at 120° C. in vacuum;

in step 2, the dried polyol is mixed with 2,2-dimethylol butanoic acid (DMBA) to react until both DMBA and polyol become transparent;

in step 3, diisocyanate which having functional group of isocyanate (—NCO), is added to the mixture to react at 70-90° C. and a rotational speed 50-100 rpm for 5-10 minutes until —NCO terminated first prepolymer is formed;

in step 4, temperature of the —NCO terminated first prepolymer is decreased to 65° C., and a neutralizing agent is added to the —NCO terminated first prepolymer until —NCO terminated second prepolymer is formed;

in step 5, the remaining —NCO diisocyanate from step 3 is added to —NCO terminated second prepolymer is added to mix, and deionized water is added to form prepolymer dispersion; and in step 6, ethylene diamine (EDA) chain extension agent is added, rotated at a range of 200 to 2,000 rpm for chain extension for 1-3 hours until solid content 40.0 wt. % solvent free PUD is produced.

Preferred embodiments 1 to 4 are directed to methods of synthesizing solvent free PUD by different kinds of polyol.

Preferred Embodiment 1: Polyhexamethylene Carbonate (PCD) 2000 is Used as Polyol of PUD In step 1, 90-110 g (0.045-0.055 mol) having 2,000 g/mol of PCD 2000 is dried at 120° C. in vacuum for about two hours.

In step 2, the dried PCD 2000 is mixed with 7.0-8.0 g (0.047-0.054 mol) of DMBA at a reaction vessel at 90° C., a rotational speed 100 rpm for about one hour until both DMBA and PCD 2000 become transparent.

In step 3, 7.0-8.0 g (0.042-0.04 mol) of hexamethylene diisocyanate (HDI) and 15.0-17.0 g (0.067-0.076 mol) of isophorone diisocyanate (IPDI) are added in and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 4.0-5.0 g (0.040-0.049 mol) of triethylamine (TEA) is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining IPDI at step 3 is added to mix for 10-15 minutes. Then 196.5-237.0 g of deionized water is added to the prepolymer for dispersion of one hour until prepolymer dispersion is formed.

In step 6, the prepolymer dispersion is conveyed to an emulsifier machine. Then 1.0-2.0 g (0.017-0.033 mol) of ethylene diamine (EDA) chain extension agent is added to. The emulsifier machine is rotated at 2,000 rpm for chain extension for 1-2 hours until solid content 40.0 wt. % solvent free PUD, called HIC2, is produced.

Preferred Embodiment 2: Polytetramethylene Ether Glycol (PTMEG) 2000 is Used as Polyol of PUD In step 1, 90-110 g (0.045-0.055 mol) having 2,000 g/mol of PTMEG 2000 is dried at 120° C. in vacuum for about two hours.

In step 2, the dried PTMEG 2000 is mixed with 7.0-8.0 g (0.047-0.054 mol) of DMBA at a reaction vessel at 90° C., a rotational speed 100 rpm for about one hour until both DMBA and PTMEG 2000 become transparent.

In step 3, 7.0-8.0 g (0.042-0.04 mol) of HDI and 15.0-17.0 g (0.067-0.076 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 4.0-5.0 g (0.040-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining IPDI at step 3 is added to mix for 10-15 minutes. Then 196.5-237.0 g of deionized water is added to the prepolymer for dispersion of one hour until prepolymer dispersion is formed.

In step 6, the prepolymer dispersion is conveyed to an emulsifier machine. Then 1.0-2.0 g (0.017-0.033 mol) of EDA chain extension agent is added to. The emulsifier machine is rotated at 2,000 rpm for chain extension for 1-2 hours until solid content 40.0 wt. % solvent free PUD, called HIT2, is produced.

Preferred Embodiment 3: Polybutylene Adipate (PBA) 2000 is Used as Polyol of PUD In step 1, 90-110 g (0.045-0.055 mol) having 2,000 g/mol of PBA 2000 is dried at 120° C. in vacuum for about two hours.

In step 2, the dried PBA 2000 is mixed with 7.0-8.0 g (0.047-0.054 mol) of DMBA at a reaction vessel at 90° C., a rotational speed 100 rpm for about one hour until both DMBA and PBA 2000 become transparent.

In step 3, 7.0-8.0 g (0.042-0.04 mol) of HDI and 15.0-17.0 g (0.067-0.076 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 4.0-5.0 g (0.040-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining IPDI at step 3 is added to mix for 10-15 minutes. Then 196.5-237.0 g of deionized water is added to the prepolymer for dispersion of one hour until prepolymer dispersion is formed.

In step 6, the prepolymer dispersion is conveyed to an emulsifier machine. Then 1.0-2.0 g (0.017-0.033 mol) of EDA chain extension agent is added to. The emulsifier machine is rotated at 2,000 rpm for chain extension for 1-2 hours until solid content 40.0 wt. % solvent free PUD, called HIB2, is produced.

Preferred Embodiment 4: Polyhexamethylene Adipate (PHA) 2000 is Used as Polyol of PUD In step 1, 90-110 g (0.045-0.055 mol) having 2,000 g/mol of PHA 2000 is dried at 120° C. in vacuum for about two hours.

In step 2, the dried PHA 2000 is mixed with 7.0-8.0 g (0.047-0.054 mol) of DMBA at a reaction vessel at 90° C., a rotational speed 100 rpm for about one hour until both DMBA and PHA 2000 become transparent.

In step 3, 7.0-8.0 g (0.042-0.04 mol) of HDI and 15.0-17.0 g (0.067-0.076 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 4.0-5.0 g (0.040-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining IPDI at step 3 is added to mix for 10-15 minutes. Then 196.5-237.0 g of deionized water is added to the prepolymer for dispersion of one hour until prepolymer dispersion is formed.

In step 6, the prepolymer dispersion is conveyed to an emulsifier machine. Then 1.0-2.0 g (0.017-0.033 mol) of EDA chain extension agent is added to. The emulsifier machine is rotated at 2,000 rpm for chain extension for 1-2 hours until solid content 40.0 wt. % solvent free PUD, called HIH2, is produced.

Each of above preferred embodiments 1-4 can produce solid content 40.0 wt. % solvent free PUD having excellent mechanical properties by different kinds of polyol.

Table 1 provides a list including each group of PUD content for the above preferred embodiments 1-4.

TABLE 1

|  | HIC2 | HIT2 | HIB2 | HIH2 |
|---|---|---|---|---|
| HDI-IPDI (g) | 29.0-33.0 | 29.0-33.0 | 29.0-33.0 | 29.0-33.0 |
| polyol (g) | 90.0-110.0 | 90.0-110.0 | 90.0-110.0 | 90.0-110.0 |
| carboxylic diol (g) | 7.0-8.0 | 7.0-8.0 | 7.0-8.0 | 7.0-8.0 |
| TEA (g) | 4.0-5.0 | 4.0-5.0 | 4.0-5.0 | 4.0-5.0 |
| EDA (g) | 1.0-2.0 | 1.0-2.0 | 1.0-2.0 | 1.0-2.0 |
| free —NCO (%) | 0.93 ± 5% | 0.93 ± 5% | 0.93 ± 5% | 0.93 ± 5% |
| D.I. water (g) | 196.5-237.0 | 196.5-237.0 | 196.5-237.0 | 196.5-237.0 |
| polyol type | PCD 2000 | PTMEG 2000 | PBA 2000 | PHA 2000 |

The mechanical properties test results of PUD as described previously in the embodiments 1-4, are provided in the following Table 2.

TABLE 2

| Item | HIC2 | HIT2 | HIB2 | HIH2 |
|---|---|---|---|---|
| 100% modulus (MPa) | 5.6 | 2.4 | 2.9 | 3.3 |
| 300% modulus (MPa) | 17.9 | 5.1 | 7.5 | 8.7 |
| Tensile strength (MPa) | 60.1 | 53.5 | 50.5 | 44.0 |
| Elongation (%) | 691 | 1,208 | 938 | 870 |

Preferred embodiments 5 to 8 are directed to methods of synthesizing solvent free PUD by different kinds of diisocyanate.

Preferred Embodiment 5: m-Tetramethylxylylene Diisocyanate (m-TMXDI) is Used as Diisocyanate of PUD In step 1, 90-110 g (0.045-0.055 mol) having 2,000 g/mol of PBA 2000 is dried at 120° C. in vacuum for about two hours.

In step 2, the dried PBA 2000 is mixed with 7.0-8.0 g (0.047-0.054 mol) of DMBA at a reaction vessel at 90° C., a rotational speed 100 rpm for about one hour until both DMBA and PBA 2000 become transparent.

In step 3, 26.0-29.0 g (0.106-0.119 mol) of m-TMXDI is added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 5.0-6.0 g (0.049-0.059 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 8.0-10.0 g (0.033-0.035 mol) of the remaining m-TMXDI at step 3 is added to mix for 10-15 minutes. Then 207.0-249.0 g of deionized water is added to the prepolymer for dispersion of one hour until prepolymer dispersion is formed.

In step 6, the prepolymer dispersion is conveyed to an emulsifier machine. Then 2.0-3.0 g (0.033-0.050 mol) of EDA chain extension agent is added to. The emulsifier machine is rotated at 2,000 rpm for chain extension for 1-2 hours until solid content 40.0 wt. % solvent free PUD, called TB2, is produced.

Preferred Embodiment 6: Isophorone Diisocyanate (IPDI) is Used as Diisocyanate of PUD In step 1, 90-110 g (0.045-0.055 mol) having 2,000 g/mol of PBA 2000 is dried at 120° C. in vacuum for about two hours.

In step 2, the dried PBA 2000 is mixed with 7.0-8.0 g (0.047-0.054 mol) of DMBA at a reaction vessel at 90° C., a rotational speed 100 rpm for about one hour until both DMBA and PBA 2000 become transparent.

In step 3, 25.0-27.0 g (0.112-0.121 mol) of IPDI is added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 5.0-6.0 g (0.049-0.059 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining IPDI at step 3 is added to mix for 10-15 minutes. Then 202.5-238.5 g of deionized water is added to the prepolymer for dispersion of one hour until prepolymer dispersion is formed.

In step 6, the prepolymer dispersion is conveyed to an emulsifier machine. Then 1.0-2.0 g (0.016-0.033 mol) of EDA chain extension agent is added to. The emulsifier machine is rotated at 2,000 rpm for chain extension for 1-2 hours until solid content 40.0 wt. % solvent free PUD, called IB2, is produced.

Preferred Embodiment 7: 4,4'-Methylene Dicyclohexyl Diisocyanate ($H_{12}$MDI) is Used as Diisocyanate of PUD In step 1, 90-110 g (0.045-0.055 mol) having 2,000 g/mol of PBA 2000 is dried at 120° C. in vacuum for about two hours.

In step 2, the dried PBA 2000 is mixed with 7.0-8.0 g (0.047-0.054 mol) of DMBA at a reaction vessel at 90° C., a rotational speed 100 rpm for about one hour until both DMBA and PBA 2000 become transparent.

In step 3, 28.0-32.0 g (0.107-0.122 mol) of $H_{12}$MDI is added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 5.0-6.0 g (0.049-0.059 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining $H_{12}$MDI at step 3 is added to mix for 10-15 minutes. Then 207.0-249.0 g of deionized water is added to the prepolymer for dispersion of one hour until prepolymer dispersion is formed.

In step 6, the prepolymer dispersion is conveyed to an emulsifier machine. Then 1.0-2.0 g (0.016-0.033 mol) of EDA chain extension agent is added to. The emulsifier machine is rotated at 2,000 rpm for chain extension for 1-2 hours until solid content 40.0 wt. % solvent free PUD, called $H_{12}$B2, is produced.

Preferred Embodiment 8: Hexamethylene Diisocyanate-Isophorone Diisocyanate (HDI-IPDI) is Used as Diisocyanate of PUD In step 1, 90-110 g (0.045-0.055 mol) having 2,000 g/mol of PBA 2000 is dried at 120° C. in vacuum for about two hours.

In step 2, the dried PBA 2000 is mixed with 7.0-8.0 g (0.047-0.054 mol) of DMBA at a reaction vessel at 90° C., a rotational speed 100 rpm for about one hour until both DMBA and PBA 2000 become transparent.

In step 3, 7.0-8.0 g (0.042-0.048 mol) of HDI and 15.0-17.0 g (0.067-0.076 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 4.0-5.0 g (0.040-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 7.0-8.0 g (0.031-0.036 mol) of the remaining IPDI at step 3 is added to mix for 10-15 minutes. Then 196.5-237.0 g of deionized water is added to the prepolymer for dispersion of one hour until prepolymer dispersion is formed.

In step 6, the prepolymer dispersion is conveyed to an emulsifier machine. Then 1.0-2.0 g (0.016-0.033 mol) of EDA chain extension agent is added to. The emulsifier machine is rotated at 2,000 rpm for chain extension for 1-2 hours until solid content 40.0 wt. % solvent free PUD, called HIB2, is produced. HIB2 produced by preferred embodiments 3 and 8 are the same.

Each of above preferred embodiments 5-8 can produce solid content 40.0 wt. % solvent free PUD having excellent mechanical properties by different kinds of diisocyanate.

Table 3 provides a list including each group of PUD content for the above preferred embodiments 5-8.

TABLE 3

| | TB2 | IB2 | $H_{12}B2$ | HIB2 |
|---|---|---|---|---|
| diisocyanate (g) | 34.0-39.0 | 32.0-35.0 | 35.0-42.0 | 29.0-33.0 |
| polyol (g) | 90.0-110.0 | 90.0-110.0 | 90.0-110.0 | 90.0-110.0 |
| carboxylic diol (g) | 7.0-8.0 | 7.0-8.0 | 7.0-8.0 | 7.0-8.0 |
| TEA (g) | 5.0-6.0 | 5.0-6.0 | 5.0-6.0 | 4.0-5.0 |
| EDA (g) | 2.0-3.0 | 1.0-2.0 | 1.0-2.0 | 1.0-2.0 |
| free —NCO (%) | 0.93 ± 5% | 0.93 ± 5% | 0.93 ± 5% | 0.93 ± 5% |
| D.I. water (g) | 207.0-249.0 | 202.5-238.5 | 207.0-249.0 | 196.5-237.0 |
| isocyanate type | m-TMXDI | IPDI | $H_{12}MDI$ | HDI-IPDI |

The mechanical properties test results of PUD as described previously in the embodiments 5-8, are provided in the following Table 4.

TABLE 4

| Item | TB2 | IB2 | $H_{12}B2$ | HIB2 |
|---|---|---|---|---|
| 100% modulus (MPa) | 5.0 | 1.9 | 4.2 | 2.9 |
| 300% modulus (MPa) | 15.6 | 2.8 | 12.8 | 7.5 |
| Tensile strength (MPa) | 52.6 | 15.6 | 38.8 | 50.5 |
| Elongation (%) | 630 | 1,750 | 790 | 938 |

Preferred embodiments 9 to 12 are directed to methods of synthesizing solvent free PUD by different kinds of chain extension agent.

Preferred Embodiment 9: EDA is Used as Chain Extension Agent of PUD

In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 162.0-206.3 g of deionized water is added to the prepolymer for dispersion of one hour until prepolymer dispersion is formed.

In step 6, the prepolymer dispersion is conveyed to an emulsifier machine. Then 2.0-3.0 g (0.033-0.050 mol) of EDA chain extension agent is added to. The emulsifier machine is rotated at 2,000 rpm for chain extension for 1-2 hours until solid content 40.0 wt. % solvent free PUD, called HIT2E, is produced.

Preferred Embodiment 10: Hydrazine (HH) is Used as Chain Extension Agent of PUD

In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 160.5-204.8 g of deionized water is added to the prepolymer for dispersion of one hour until prepolymer dispersion is formed.

In step 6, the prepolymer dispersion is conveyed to an emulsifier machine. Then 1.0-1.5 g (0.031-0.047 mol) of HH chain extension agent is added to. The emulsifier machine is rotated at 2,000 rpm for chain extension for 1-2 hours until solid content 40.0 wt. % solvent free PUD, called HIT2H, is produced.

Preferred Embodiment 11: Carbonic Dihydrazide (CDH) is Used as Chain Extension Agent of PUD In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 160.5-204.8 g of deionized water is added to the prepolymer for dispersion of one hour until prepolymer dispersion is formed.

In step 6, the prepolymer dispersion is conveyed to an emulsifier machine. Then 3.0-3.5 g (0.033-0.039 mol) of CDH chain extension agent is added to. The emulsifier machine is rotated at 2,000 rpm for chain extension for 1-2 hours until solid content 40.0 wt. % solvent free PUD, called HIT2C, is produced.

Preferred Embodiment 12: Adipic Dihydrazide (ADH) is Used as Chain Extension Agent of PUD In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 162.0-206.3 g of deionized water is added to the prepolymer for dispersion of one hour until prepolymer dispersion is formed.

In step 6, the prepolymer dispersion is conveyed to an emulsifier machine. Then 6.0-7.0 g (0.034-0.040 mol) of ADH chain extension agent is added to. The emulsifier machine is rotated at 2,000 rpm for chain extension for 1-2 hours until solid content 40.0 wt. % solvent free PUD, called HIT2A, is produced.

Each of above preferred embodiments 9-12 can produce solid content 40.0 wt. % solvent free PUD having excellent mechanical properties by different kinds of chain extension agent.

Table 5 provides a list including each group of PUD content for the above preferred embodiments 9-12.

TABLE 5

|  | HIT2E | HIT2H | HIT2C | HIT2A |
| --- | --- | --- | --- | --- |
| HDI-IPDI (g) | 28.0-33.0 | 28.0-33.0 | 28.0-33.0 | 28.0-33.0 |
| polyol (g) | 70.0-90.0 | 70.0-90.0 | 70.0-90.0 | 70.0-90.0 |
| carboxylic diol (g) | 5.0-7.0 | 5.0-7.0 | 5.0-7.0 | 5.0-7.0 |
| TEA (g) | 3.0-5.0 | 3.0-5.0 | 3.0-5.0 | 3.0-5.0 |
| chain extender (g) | 2.0-2.5 | 1.0-1.5 | 3.0-3.5 | 6.0-7.0 |
| free —NCO (%) | 0.93 ± 5% | 0.93 ± 5% | 0.93 ± 5% | 0.93 ± 5% |
| D.I. water (g) | 162.0-206.3 | 160.5-204.8 | 163.5-207.8 | 168.0-213.0 |
| chain extender type | EDA | HH | CDH | ADH |

The mechanical properties test results of PUD as described previously in the embodiments 9-12, are provided in the following Table 6.

TABLE 6

| Item | HIT2E | HIT2H | HIT2C | HIT2A |
| --- | --- | --- | --- | --- |
| 100% modulus (MPa) | 4.2 | 4.0 | 5.3 | 4.4 |
| 300% modulus (MPa) | 9.2 | 8.9 | 11.6 | 9.2 |
| Tensile strength (MPa) | 40.7 | 43.0 | 46.0 | 31.7 |
| Elongation (%) | 772 | 875 | 866 | 774 |

Preferred embodiments 13 to 16 are directed to methods of synthesizing solvent free PUD by different average speeds of chain extension.

Preferred Embodiment 13: 200 Rpm is an Average Speed of Chain Extension of PUD In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 162.0-206.3 g of deionized water is added to the prepolymer for dispersion of one hour until prepolymer dispersion is formed.

In step 6, the prepolymer dispersion is conveyed to an emulsifier machine. Then 2.0-2.5 g (0.033-0.042 mol) of EDA chain extension agent is added to. The emulsifier machine is rotated at an average speed of 200 rpm for chain extension for 1-3 hours until solid content 40.0 wt. % solvent free PUD, called HI200r, is produced.

Preferred Embodiment 14: 500 Rpm is an Average Speed of Chain Extension of PUD In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 162.0-206.3 g of deionized water is added to the prepolymer for dispersion of one hour until prepolymer dispersion is formed.

In step 6, the prepolymer dispersion is conveyed to an emulsifier machine. Then 2.0-2.5 g (0.033-0.042 mol) of EDA chain extension agent is added to. The emulsifier machine is rotated at an average speed of 500 rpm for chain extension for 1-3 hours until solid content 40.0 wt. % solvent free PUD, called HI500r, is produced.

Preferred Embodiment 15: 1,000 Rpm is an Average Speed of Chain Extension of PUD In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 162.0-206.3 g of deionized water is added to the prepolymer for dispersion of one hour until prepolymer dispersion is formed.

In step 6, the prepolymer dispersion is conveyed to an emulsifier machine. Then 2.0-2.5 g (0.033-0.042 mol) of EDA chain extension agent is added to. The emulsifier machine is rotated at an average speed of 1,000 rpm for chain extension for 1-3 hours until solid content 40.0 wt. % solvent free PUD, called HI1000r, is produced.

Preferred Embodiment 16: 2,000 Rpm is an Average Speed of Chain Extension of PUD In step 1, 70-90 g (0.035-0.045 mol) having 2,000 g/mol of PTMEG is dried at 120° C. in vacuum for about two hours.

In step 2, the dried PTMEG is mixed with 5.0-7.0 g (0.047-0.047 mol) of DMBA at a reaction vessel at 90° C., a rotational speed 100 rpm for about one hour until both DMBA and PTMEG become transparent.

In step 3, 7.0-8.0 g (0.042-0.048 mol) of HDI and 9.0-11.0 g (0.040-0.049 mol) of IPDI are added in step 2 and together they are reacted to form isocyanate terminated polyurethane at 90° C. and 50-100 rpm for polymerization reaction for 5-10 minutes until —NCO terminated first prepolymer is formed.

In step 4, temperature is decreased to 65° C. and then 3.0-5.0 g (0.030-0.049 mol) of TEA is added for neutralization and catalysis until —NCO terminated second prepolymer is formed.

In step 5, di-n-butylamine back titration method is used to measure equivalent of —NCO terminated prepolymer until the equivalent of prepolymer is controlled at 4,500 g/eq. mol±5% (free —NCO %=0.93±5%). Then 12.0-14.0 g (0.054-0.063 mol) of the remaining IPDI at step 3 is added to mix for 10-15 minutes. Then 162.0-206.3 g of deionized water is added to the prepolymer for dispersion of one hour until prepolymer dispersion is formed.

In step 6, the prepolymer dispersion is conveyed to an emulsifier machine. Then 2.0-2.5 g (0.033-0.042 mol) of EDA chain extension agent is added to. The emulsifier machine is rotated at an average speed of 2,000 rpm for chain extension for 1-2 hours until solid content 40.0 wt. % solvent free PUD, called HI2000r, is produced.

Table 7 provides a list including each group of PUD content for the above preferred embodiments 13-16.

TABLE 7

|  | HI200r | HI500r | HI1000r | HI2000r |
| --- | --- | --- | --- | --- |
| HDI-IPDI (g) | 28.0-33.0 | 28.0-33.0 | 28.0-33.0 | 28.0-33.0 |
| polyol (g) | 70.0-90.0 | 70.0-90.0 | 70.0-90.0 | 70.0-90.0 |
| carboxylic diol (g) | 5.0-7.0 | 5.0-7.0 | 5.0-7.0 | 5.0-7.0 |
| TEA (g) | 3.0-5.0 | 3.0-5.0 | 3.0-5.0 | 3.0-5.0 |
| chain extender (g) | 2.0-2.5 | 2.0-2.5 | 2.0-2.5 | 2.0-2.5 |
| free —NCO (%) | 0.93 ± 5% | 0.93 ± 5% | 0.93 ± 5% | 0.93 ± 5% |
| D.I. water (g) | 162.0-206.3 | 162.0-206.3 | 162.0-206.3 | 162.0-206.3 |
| homogeneous rate (rpm) | 200 | 500 | 1,000 | 2,000 |

The mechanical properties test results of PUD as described previously in the embodiments 13-16, are provided in the following Table 8.

TABLE 8

| Item | HI200r | HI500r | HI1000r | HI2000r |
|---|---|---|---|---|
| 100% modulus (MPa) | 3.4 | 3.8 | 4.4 | 5.2 |
| 300% modulus (MPa) | 6.0 | 8.3 | 8.3 | 10.4 |
| Tensile strength (MPa) | 33.7 | 34.0 | 37.1 | 38.5 |
| Elongation (%) | 976 | 985 | 1,019 | 1,021 |

Each of above preferred embodiments 13-16 can produce solid content 40.0 wt. % solvent free PUD having excellent mechanical properties by different average speeds of chain extension.

The above polyurethane is a polymer containing an urethane group on the molecular bond and includes a polymer having both an urethane group and an urea group.

In the method of producing polyurethane dispersion (PUD) by a solvent free process of the invention, no organic solvent is added thereto.

While the invention has been described in terms of preferred embodiments, those skilled in the art will recognize that the invention can be practiced with modifications within the spirit and scope of the appended claims.

What is claimed is:

1. A method of producing polyurethane dispersion (PUD) by a solvent free process comprising the steps of:
   (1) drying polyol at a predetermined temperature in vacuum for a predetermined period of time;
   (2) placing both the dried polyol and 2,2-dimethylol butanoic acid (DMBA) in a reaction vessel to mix at 90° C. and rotate at a rotational speed 100 rpm until a first mixture becomes transparent;
   (3) adding diisocyanate having isocyanate functional group (—NCO) to the first mixture to react at 70-90° C. and a rotational speed 50-100 rpm for 5-10 minutes until —NCO terminated first prepolymer is formed;
   (4) decreasing temperature of the —NCO terminated first prepolymer to 65° C.;
   (5) adding a neutralizing agent to the —NCO terminated first prepolymer for neutralization and catalysis until —NCO terminated second prepolymer is formed;
   (6) adding the remaining diisocyanate having isocyanate functional group from step (3) to the —NCO terminated second prepolymer to form a second mixture;
   (7) adding deionized water to the second mixture to form prepolymer dispersion; and
   (8) adding chain extension agent to the prepolymer dispersion to rotate at a range of 200 to 2,000 rpm for chain extension for 1-3 hours until solid content 40.0 wt. % solvent free PUD is produced;
   wherein a mole ratio of the polyol to the DMBA is 0.60 to 9.17, and a molar percentage of the polyol to DMBA is 36.9%:63.1% to 90.2%:9.8%;
   wherein a mole ratio of the diisocyanate having isocyanate functional group to the first mixture is 1.20 to 2.00, and a molar percentage of the diisocyanate having isocyanate functional group to the first mixture is 54.5%:45.5% to 66.7%:33.3%;
   wherein a mole ratio of the —NCO terminated first prepolymer to the neutralizing agent is 0.17 to 0.77, and a molar percentage of the —NCO terminated first prepolymer to the neutralizing agent is 14.5%:85.5% to 44.0%:56.0%; and
   wherein a mole ratio of the —NCO terminated second prepolymer to the remaining diisocyanate having isocyanate functional group is 0.07 to 98.44, and a molar percentage of the —NCO terminated second prepolymer to the remaining diisocyanate having isocyanate functional group is 6.7%:93.3% to 99.0%:1.0%.

2. The method of claim 1, wherein a hydrophilic percentage is defined as weight of hydrophilic molecules divided by weight of polyurethane (PU) molecules times 100%; a weight percentage (w/w) of hydrophilic molecules is 2.0 to 7.0%, the weight percentage (w/w) is 2.0%:98.0% to 6.5%:93.5%, wherein the weight of hydrophilic molecules is weight of DMBA molecules; and the weight of PU molecules is defined as a summation of weights of molecules of diisocyanate, polyol, DMBA, the neutralizing agent, and the chain extension agent.

3. The method of claim 1, wherein equivalent of —NCO terminated second prepolymer is controlled at 4,500 g/eq. mol±5%, free —NCO %=0.93±5%; and a di-n-butylamine back titration method is used to measure the equivalent of —NCO terminated second prepolymer.

4. The method of claim 1, wherein in the step (1) the predetermined temperature is 120° C. and the predetermined period of time is two hours.

5. The method of claim 1, wherein in the step (2) both the dried polyol and DMBA are in the reaction vessel to mix for one hour.

6. The method of claim 1, wherein polyurethane (PU) is a polymer containing an urethane group on a molecular bond and includes a polymer having both an urethane group and an urea group.

7. The method of claim 1, wherein a molar mass of the polyol is 500 to 2,000 g/mol, and the polyol is implemented as a polycarbonate diols (PCD) having a functional group of carbonate, a polyether diols having a functional group of ether, a polyester diols having a functional group of ester, or a combination of any of polycarbonate diols (PCD) having a functional group of carbonate, a polyether diols having a functional group of ether, and a polyester diols having a functional group of ester.

8. The method of claim 1, wherein diisocyanates is implemented as m-TMXDI, IPDI, $H_{12}$MDI, HDI, CHDI, XDI, $H_6$XDI, 2,2,4/2,4,4-trimethyl-1,6-diisocyanatohexane, 50%/50%, TMHDI, 5/2,6-bis (isocyanatomethyl) bicycle [2.2.1] heptane, NBDI, HTDI, LDI, 1,8-octamethylene diisocyanate, 1,10-decamethylene diisocyanate, 1,12-dodecamethylene diisocyanate, MPDI, or a combination of any of m-TMXDI, IPDI, $H_{12}$MDI, HDI, CHDI, XDI, $H_6$XDI, 2,2,4/2,4,4-trimethyl-1,6-diisocyanatohexane, 50%/50%, TMHDI, 5/2,6-bis (isocyanatomethyl) bicycle[2.2.1] heptane, NBDI, HTDI, LDI, 1,8-octamethylene diisocyanate, 1,10-decamethylene diisocyanate, 1,12-dodecamethylene diisocyanate, and MPDI.

9. The method of claim 1, wherein the neutralizing agent is implemented as TEA, TPA, LiOH, NaOH, KOH, or a combination of any of TEA, TPA, LiOH, NaOH, and KOH.

10. The method of claim 1, wherein a molar mass of the chain extension agent is less than 400 g/mol and is implemented as diamines or diols; wherein the diamines is implemented as EDA, BDA, PDA, HDA, HH, CDH, ADH; and wherein the diols is implemented as EG, PG, BG, pentylene glycol, HG, or a combination of any of EG, PG, BG, pentylene glycol, and HG.

* * * * *